(12) United States Patent
Agarwal et al.

(10) Patent No.: US 7,801,738 B2
(45) Date of Patent: Sep. 21, 2010

(54) SYSTEM AND METHOD FOR RATING DOCUMENTS COMPRISING AN IMAGE

(75) Inventors: Sumit Agarwal, San Carlos, CA (US); Wesley Chan, Mountain View, CA (US); Leora Ruth Wiseman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1666 days.

(21) Appl. No.: 10/841,834

(22) Filed: May 10, 2004

(65) Prior Publication Data

US 2005/0251399 A1  Nov. 10, 2005

(51) Int. Cl.
*G06Q 99/00* (2006.01)
(52) U.S. Cl. ........................................ 705/1.1
(58) Field of Classification Search ........ 705/1
See application file for complete search history.

(56) References Cited

U.S. PATENT DOCUMENTS

| | | |
|---|---|---|
| 5,636,346 A | 6/1997 | Saxe |
| 5,724,521 A | 3/1998 | Dedrick et al. |
| 5,845,265 A | 12/1998 | Woolston |
| 5,872,588 A | 2/1999 | Aras et al. |
| 5,918,010 A | 6/1999 | Appleman et al. |
| 5,920,854 A | 7/1999 | Kirsch et al. |
| 5,931,901 A | 8/1999 | Wolfe et al. |
| 5,948,061 A | 9/1999 | Merriman et al. |
| 5,974,398 A | 10/1999 | Hanson et al. |
| 6,026,368 A | 2/2000 | Brown et al. |
| 6,044,375 A | 3/2000 | Shmueli et al. |
| 6,061,659 A | 5/2000 | Murray |
| 6,061,696 A | 5/2000 | Lee et al. |
| 6,067,570 A | 5/2000 | Kreynin et al. |
| 6,078,866 A | 6/2000 | Buck et al. |
| 6,185,589 B1 | 2/2001 | Votipka |
| 6,223,163 B1 | 4/2001 | Van Luchene |
| 6,230,170 B1 | 5/2001 | Zellweger et al. |
| 6,247,009 B1 | 6/2001 | Shiiyama et al. |
| 6,253,189 B1 | 6/2001 | Feezell et al. |
| 6,269,361 B1 | 7/2001 | Davis et al. |

(Continued)

FOREIGN PATENT DOCUMENTS

EP  1026610 A2  8/2000

(Continued)

OTHER PUBLICATIONS

Google Introduces New Pricing For Popular Self-Service Online Advertising Program, http://www.google.com/press/pressrel/select.html, p. 1-2, dated Feb. 20, 2002, printed on Jul. 29, 2003.

(Continued)

*Primary Examiner*—Jonathan Ouellette
(74) *Attorney, Agent, or Firm*—Fish & Richardson P.C.

(57) ABSTRACT

A system and method for rating a document comprising an image are provided. A document is received for distribution. Rating information associated with the document is received from one or more rating entities. At least one of said one or more rating entities comprises a processor to determine rating information associated with the image. The document is approved for distribution based on the rating information.

59 Claims, 8 Drawing Sheets

U.S. PATENT DOCUMENTS

| | | |
|---|---|---|
| 6,285,987 B1 | 9/2001 | Roth et al. |
| 6,295,559 B1 | 9/2001 | Emens et al. |
| 6,298,348 B1 | 10/2001 | Eldering |
| 6,324,519 B1 | 11/2001 | Eldering |
| 6,336,132 B2 | 1/2002 | Appleman et al. |
| 6,421,675 B1 | 7/2002 | Ryan et al. |
| 6,606,644 B1 | 8/2003 | Ford et al. |
| 7,072,888 B1 * | 7/2006 | Perkins .......................... 707/5 |
| 2001/0042064 A1 | 11/2001 | Davis et al. |
| 2001/0042085 A1 | 11/2001 | Peairs et al. |
| 2001/0047297 A1 | 11/2001 | Wen |
| 2001/0051911 A1 | 12/2001 | Marks et al. |
| 2002/0002509 A1 | 1/2002 | Wagorn et al. |
| 2002/0002525 A1 | 1/2002 | Arai et al. |
| 2002/0026359 A1 | 2/2002 | Long et al. |
| 2002/0035536 A1 | 3/2002 | Gellman |
| 2002/0038282 A1 | 3/2002 | Montgomery |
| 2002/0046099 A1 | 4/2002 | Frengut et al. |
| 2002/0046104 A1 | 4/2002 | Kaddeche et al. |
| 2002/0052890 A1 | 5/2002 | Ingram et al. |
| 2002/0059221 A1 | 5/2002 | Whitehead et al. |
| 2002/0077891 A1 | 6/2002 | Castle et al. |
| 2002/0099605 A1 | 7/2002 | Weitzman et al. |
| 2002/0111898 A1 | 8/2002 | Numaoka et al. |
| 2002/0123988 A1 | 9/2002 | Dean et al. |
| 2002/0165773 A1 | 11/2002 | Natsuno et al. |
| 2002/0184097 A1 | 12/2002 | Hijiri et al. |
| 2002/0194062 A1 | 12/2002 | Linde |
| 2002/0198780 A1 | 12/2002 | Kawakami et al. |
| 2003/0037334 A1 | 2/2003 | Khoo et al. |
| 2003/0070167 A1 | 4/2003 | Holtz et al. |
| 2003/0083937 A1 | 5/2003 | Hasegawa et al. |
| 2003/0126267 A1 | 7/2003 | Gutta et al. |
| 2003/0149618 A1 | 8/2003 | Sender et al. |
| 2003/0163372 A1 | 8/2003 | Kolsy |
| 2003/0216963 A1 | 11/2003 | Ishiwaka et al. |
| 2004/0015397 A1 | 1/2004 | Barry et al. |
| 2004/0019523 A1 | 1/2004 | Barry et al. |
| 2004/0044571 A1 | 3/2004 | Bronnimann et al. |
| 2004/0054577 A1 | 3/2004 | Inoue et al. |
| 2004/0054589 A1 | 3/2004 | Nicholas et al. |
| 2004/0059625 A1 | 3/2004 | Schrader |
| 2004/0059708 A1 | 3/2004 | Dean et al. |
| 2004/0059712 A1 | 3/2004 | Dean et al. |
| 2004/0093327 A1 | 5/2004 | Anderson et al. |
| 2004/0093620 A1 | 5/2004 | Iino et al. |
| 2004/0107363 A1 * | 6/2004 | Monteverde ................ 713/201 |
| 2004/0119740 A1 | 6/2004 | Chang et al. |
| 2004/0143499 A1 | 7/2004 | Dietsch et al. |
| 2004/0143843 A1 | 7/2004 | Khoo et al. |
| 2004/0158865 A1 | 8/2004 | Kubler et al. |
| 2004/0167928 A1 | 8/2004 | Anderson et al. |
| 2004/0249709 A1 | 12/2004 | Donovan et al. |
| 2004/0261096 A1 * | 12/2004 | Matz .......................... 725/28 |
| 2005/0033849 A1 | 2/2005 | Matz |
| 2005/0065806 A1 | 3/2005 | Harik |
| 2005/0071224 A1 | 3/2005 | Fikes et al. |
| 2005/0081043 A1 | 4/2005 | Evans et al. |
| 2005/0096979 A1 | 5/2005 | Koningstein |
| 2005/0131758 A1 | 6/2005 | Desikan et al. |
| 2005/0131762 A1 | 6/2005 | Bharat et al. |
| 2005/0144069 A1 | 6/2005 | Wiseman et al. |
| 2005/0216335 A1 | 9/2005 | Fikes et al. |
| 2005/0222900 A1 | 10/2005 | Fuloria et al. |
| 2005/0222903 A1 | 10/2005 | Buchheit et al. |
| 2005/0222989 A1 | 10/2005 | Haveliwala et al. |
| 2005/0223002 A1 | 10/2005 | Agarwal et al. |

FOREIGN PATENT DOCUMENTS

| | | |
|---|---|---|
| WO | WO 0038074 | 6/2000 |
| WO | WO0163835 A1 | 8/2001 |
| WO | WO 2004/042525 | 5/2004 |

OTHER PUBLICATIONS

Collection of pages from www.overture.com, printed on Jul. 29, 2003.

Collection of pages from findwhat.com, http://www.findwhat.com, printed on Jul. 29, 2003.

Collection of pages from Sprinks.com, http://www.sprinks.com, printed on Jul. 29, 2003.

Collection of pages from Kandoodle.com, http://www.kanoodle.com, printed on Jul. 29, 2003.

Collection of pages from Google Advertising, http://www.google.com, printed on Jul. 29, 2003.

Chris Sherman, "Google Launches AdWords Select," Feb. 20, 2002, 6 pages.

Examination Report mailed Jan. 18, 2010 in corresponding Australian Application No. 2005242772, 3 pages.

Supplementary European Search Report in counterpart European Application No. 05746673.2, dated Apr. 15, 2010, 4 pages.

* cited by examiner

| | |
|---|---|
| DOCUMENT/IMAGE EVALUATION | 600 |

Text Detected: "Stock up at StockUpFilms.biz.
Digital Film VHS DVD Standard 8, 16mm 35mm and Super-8 SOUND Go to www.StockUpFilms.biz Feedback - Ads by Google"

Content keywords for text: film, projector, movie, DVD, digital film, 16mm film, 35mm film Image(s) Detected: film projector, DVD icon Content keywords for image(s): film, projector, movie, DVD Flesh Detection: 2%  Insignificant - OK Mature content: None Alcohol-related content: None Drug-related content: None Religious content: None Non-English language content: None Publisher trust score: 87%
Publisher sensitivity: 75%

Average feedback rating: 7.8/10  OK
Number of end-users providing feedback: 5
Number of end-user viewings: 725
Feedback rate: 0.0069%
Total number of ratings: 7
Click through rate: 3.5%
Transaction rate: 0.032%
Total transaction volume: $79.50

General Approval Rating: 8/10

Approval Status: Approved for general audiences

FIG. 6

Feedback Questionnaire

Document: Petchow Dog Food Advertisement
Owner of Document: OwnerCo, Inc.
Creator of Document: CreatorCo, Inc.

700

Name of evaluator:
Address:
City, State, Country:
Evaluator entity:

On a scale of 1-10, where ten is the largest amount (or highest degree) and one is the smallest (or lowest), please rate the document according to the following criteria:

701

1. Violent content:
2. Sexually explicit content:
3. Content inappropriate for children:
4. Content inappropriate for teenagers:
5. Content relating to the consumption of alcohol or drugs:
6. Content inappropriate for persons of a particular race:
   please name the race _____
7. Content inappropriate for a specific religion or creed:
   please name the creed _____
8. Content inappropriate for a specific national origin:
   please name the national origin:
9. Foreign language content:
10. Offensive audio content:
11. Offensive video content:
12. Is this document suitable for children? (Yes/No) ____
13. What time of day may this document be shown (check all that are applicable):
   _____ 6am-7pm; _____ 7-11pm; _____11pm-6am
14. Is there any reason this document is not suitable for the average person?
   If yes, please explain: _____

702

703

A. How many inappropriate words were used in this document?
   If yes, which word(s)?
B. What is the length of this document?
C. Does this document contain any (i) broken or (ii) inappropriate or offensive links (e.g., link to an inappropriate website)?

FIG. 7

Feedback Questionnaire

Document: Petchow Dog Food Advertisement
Owner of Document: OwnerCo, Inc.
Creator of Document: CreatorCo, Inc.

Name of evaluator: John Smith
Address: 123 Oak Terrace
City, State, Country: Springfield, IL
Evaluator entity: Booze DistributorCo.

On a scale of 1-10, where ten is the largest amount (or highest degree) and one is the smallest (or lowest), please rate the document according to the following criteria:

1. Violent content: <u>4</u>
2. Sexually explicit content: <u>6</u>
3. Content inappropriate for children: <u>5</u>
4. Content inappropriate for teenagers: <u>1</u>
5. Content relating to the consumption of alcohol or drugs: <u>1</u>
6. Content inappropriate for persons of a particular race: <u>No</u>
    please name the race _____
7. Content inappropriate for a specific religion or creed: <u>No</u>
    please name the creed _____
8. Content inappropriate for a specific national origin: <u>Yes</u>
    please name the national origin: <u>Canada</u>
9. Foreign language content: <u>minimal</u>
10. Offensive audio content: <u>heavy metal music in background</u>
11. Offensive video content: <u>woman wearing bikini</u>
12. Is this document suitable for children? (Yes/No) ____
13. What time of day may this document be shown (check all that are applicable):
    _____ 6am-7pm; _____ 7-11pm; _____ 11pm-6am
12. Is there any reason this document is not suitable for the average person? <u>No.</u>
    If yes, please explain: _____

A. How many inappropriate words were used in this document? 1
    If yes, which word(s)? <u>sucks</u>
B. What is the length of this document? <u>Medium</u>
C. Does this document contain any (i) broken or (ii) inappropriate or offensive links (e.g., link to an inappropriate website)? N/A

FIG. 8

SYSTEM AND METHOD FOR RATING DOCUMENTS COMPRISING AN IMAGE

FIELD OF THE INVENTION

The present invention relates to a system and method for rating a document such as an image advertisement.

BACKGROUND OF THE INVENTION

With the advent of the Internet, a seemingly limitless variety of text and graphic content, such as advertisements, may be provided to people of varying ages, preferences, and sensibilities. Some images and other content may be more appropriate for some individuals and groups than for others. For instance, violent or pornographic images are typically deemed inappropriate for children. Providing audience-appropriate content is desirable because it generally maximizes benefits and minimizes burdens for both the content provider and the audience. For instance, an audience-appropriate and relevant ad is more likely to generate a sale than an offensive and irrelevant one.

Accordingly, ads and other content are often targeted to specific audiences that may have an interest in the content. For instance, ads directed to males may be displayed during nationally televised football events because they draw large numbers of male viewers. Similarly, an ad for an airline may be displayed at an Internet search engine site when a user submits a query including the word "plane."

However, providing ads and other documents based on user-related content does not ensure that the text, images, and other content of the document is appropriate for a particular audience. For instance, a beer advertisement may not be appropriate on a website for recovering alcoholics, even though the ad and the content of the website are related by subject matter.

One method of matching appropriate images and other content to an audience is to manually review the content before distributing it to the audience. However, there are problems associated with manual review. For example, one significant drawback of manual rating systems and methods is the time and expense involved in reviewing the content.

These and other drawbacks exist with current systems and methods.

SUMMARY OF THE INVENTION

Accordingly, various embodiments of the present inventions may be directed to a system and a method for rating and/or approving documents such as image advertisements. In one exemplary embodiment, a method for rating a document comprising an image is provided. A document is received for distribution. Rating information associated with the document is received from one or more rating entities. At least one of the one or more rating entities comprises a processor to determine rating information associated with the image. The document is approved for distribution based on the rating information.

Another exemplary embodiment involves a computer-readable medium encoded with computer program code to rate an electronic document. The program code is effective to perform the following: receive rating information associated with the document from one or more rating entities, wherein at least one of the one or more rating entities comprises a processor to determine rating information associated with the image; and determine whether to approve the document based on the rating information.

In another exemplary embodiment, a system for rating documents is provided. An input device receives rating information associated with a document from one or more rating entities, wherein at least one of the one or more rating entities comprises an image processor. An image processor determines rating information associated with the image. A processor determines whether to approve the document based on the rating information.

In another exemplary embodiment, a system for rating a document is provided. A rating receiving means receives rating information associated with the document from one or more rating entities, wherein at least one of the one or more rating entities comprises an image processor. An image processing means determines rating information associated with the image. A determination means determines whether to approve the document based on the rating information.

In another exemplary embodiment, a method for rating a document is provided. A signal is transmitted to an entity such as a server. The entity is configured to interpret the signal as being associated with a criteria for a document. The entity is also configured to determine whether a document comprising an image is to be delivered. The entity is configured to make this determination based in part on rating information received from a plurality of evaluators for one or more documents, and based in part on whether the one or more documents relate to the criteria. At least one of the one or more documents comprises an image. The plurality of evaluators comprises an image processor configured to process an image and rate a document. A document comprising an image is received in response to the signal.

In another exemplary embodiment, a method of rating a document is provided. One or more documents is received from a system such as a server system, wherein at least one of the one or more documents comprises an image and the system comprises an image processor to process an image and rate a document. Rating information is provided to the system for use by the system in determining whether to deliver the one or more documents in response to requests for documents, wherein the act of determining is based on the rating provided.

In another exemplary embodiment, a method for rating a specific document comprising an image is provided. The document is distributed to one or more rating entities, wherein at least one of the one or more rating entities comprises a processor to determine rating information by processing at least one of a file storing the image and optical data of the image. Rating information associated with the specific document is received from the one or more rating entities. The specific document is associated with one or more specific criteria. It is determined whether to approve the specific document based on the rating information. A request for a document relevant to a criteria is received. A document for distribution from a database comprising the specific document is distributed, wherein the selecting action is based on the criteria and the rating information.

In another exemplary embodiment, a method of rating a document is provided. A first content rating associated with a first advertisement comprising an image is received, wherein the first content rating is received from an image processor configured to determine the first content rating by processing the image. One or more second content ratings associated with the first advertisement is received from one or more evaluators, wherein at least one of the one or more evaluators is an end user. An aggregate rating for the advertisement is determined based on the rating information. A request for electronic delivery of one or more advertisements is received, wherein the request is associated with a concept. An advertisement is selected from a database comprising the first advertisement and one or more second advertisements, wherein each of the one or more second advertisements comprises an image and an aggregate rating. The selected advertisement is electronically delivered based on the request.

In another exemplary embodiment, a method of approving an electronic document is provided. An electronic document is processed for distribution, wherein the electronic document comprises a feedback mechanism to enable recipients to rate the electronic document. A plurality of requests for a document are received, wherein each request is received from one of a plurality of end users. The electronic document is passed to the plurality of end users based on the corresponding plurality of requests. The electronic document is approved for distribution based on passing the electronic document to a predetermined number of the plurality of end users without receiving more than a threshold of feedback from those end users.

Other embodiments are also within the scope of the invention.

BRIEF DESCRIPTION OF THE DRAWINGS

FIG. 6 depicts an exemplary document rating according to an embodiment of the invention.

FIG. 7 depicts an exemplary content rating request according to an embodiment of the invention.

FIG. 8 depicts an exemplary content rating according to an embodiment of the invention.

DETAILED DESCRIPTION OF EXEMPLARY EMBODIMENTS

Figure 1:
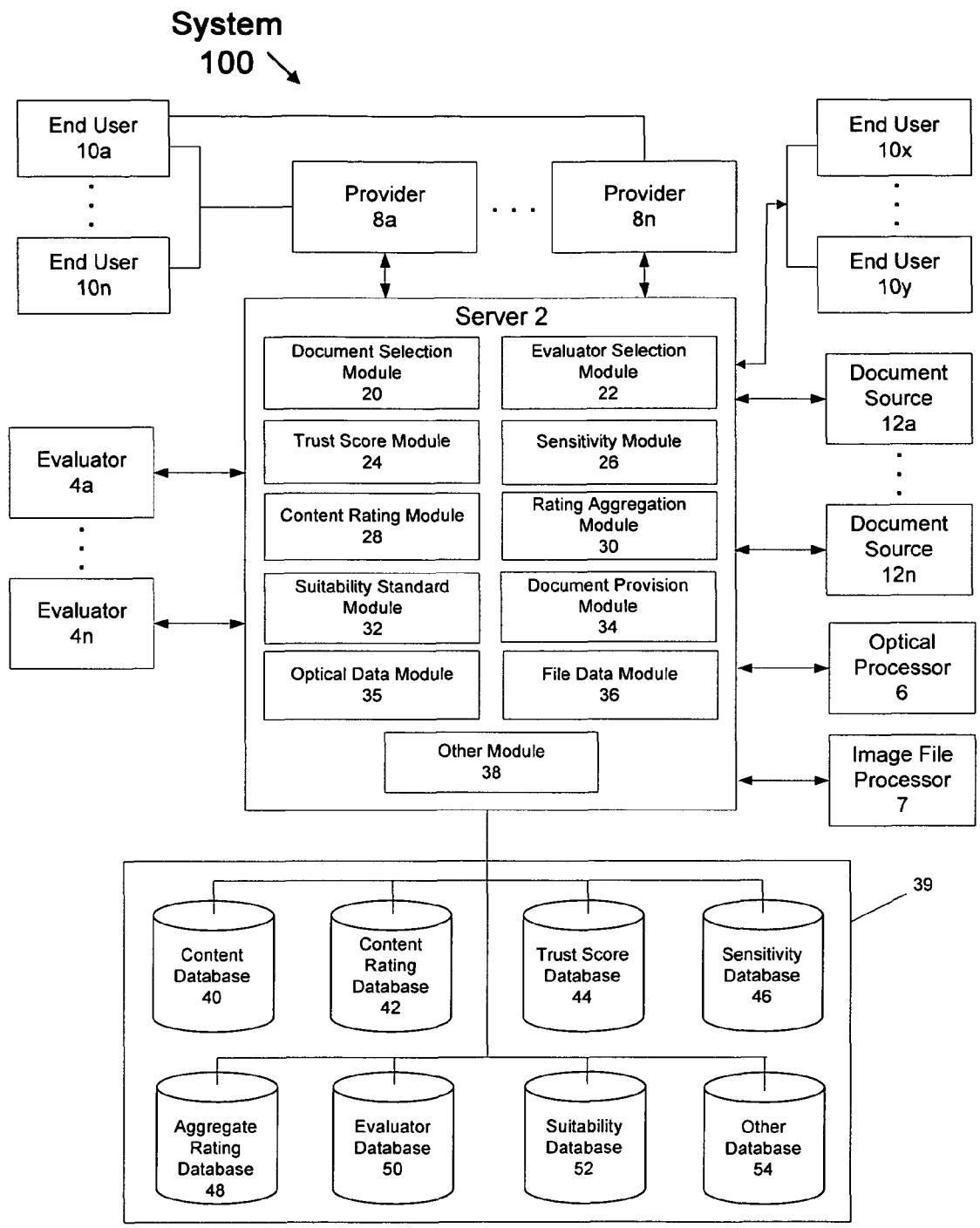
FIG. 1 depicts a system for rating an image according to an embodiment of the invention.

The embodiments described herein solve many problems with existing systems and methods. One problem facing internet content providers is evaluating a large number of documents (such as images and/or advertisements presented through its services) to determine whether each is appropriate for a wide variety of different users. Embodiments described herein overcome these and other problems by obtaining rating information from a variety of rating entities, including humans and/or computer processors. Processors may determine the rating information automatically, while humans may manually review a document to provide rating information. As used herein, the term "automatically" refers to an action being performed by any machine-executable process, e.g., a process that does not require human intervention or input. Each evaluator may review a small number of documents for example, although certain evaluators may review a large number as well. Collectively, a plurality of ratings may be collected and a reliable, aggregate rating may be determined for each document.

Another problem facing internet content providers is selecting appropriate content each time a document is requested by a different user with different sensibilities and preferences. Embodiments described herein overcome these problems by determining a generally applicable, aggregate content rating for each electronic document. Instead of re-evaluating a document each time it may be provided to a user, the content provider may only review or process the document's aggregate content rating in order to match appropriate content with a user or provider. Each time the document is distributed, the suitability of the document to a particular audience may be efficiently determined with reference to the content rating and audience suitability data.

Yet another problem is that content providers may, in some circumstances, be held to a higher duty (e.g., legal duty) of appropriate content distribution when the content provider is aware of offensive content. In an exemplary embodiment, the content provider relies on rating(s) by others and thus may not incur a higher duty. Rather, the server at least partially delegates the review of its content to evaluators (e.g., third parties, such as partner advertisers or others). Because the content provider takes active steps to ensure that content is appropriate for end users, the content provider may be deemed to have satisfied general duties of care in preventing the improper distribution of offensive content.

As used herein, the term "document" and "electronic document" may encompass one or more advertisements, content pages (e.g., web pages), search results, emails, applications, IM messages, audio content or files, video content or files, other files, other data or applications that may reside on one or several (e.g., a network) of computer systems, or other definable concepts or content. Although an "image" or "image advertisement" is often used herein as an exemplary document, it should be understood that any document may be used.

This application is related to U.S. patent application entitled "System and Method for Rating Electronic Documents" filed Mar. 30, 2004, which is incorporated herein by reference in its entirety. This application is also related to the U.S. patent application entitled "Method And System For Approving Documents Based On Image Similarity," filed concurrently, and the U.S. patent application entitled "Method And System For Providing Targeted Documents Based On Concepts Automatically Identified Therein," filed concurrently, both of which are incorporated herein by reference in their entirety.

Overview and System Illustration

Figure 2:
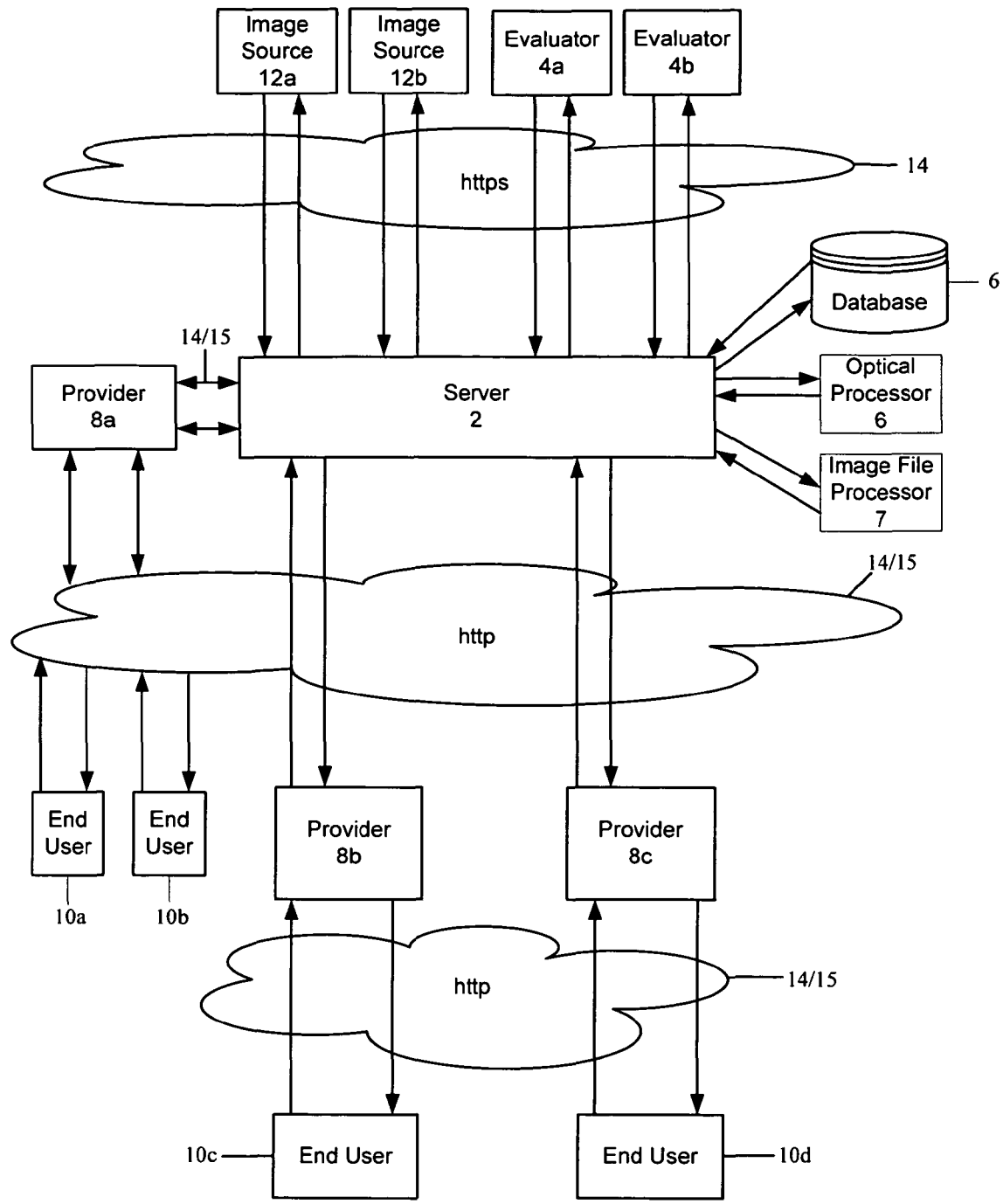
FIG. 2 depicts a networked environment for operation of a system for rating an image according to an embodiment of the invention.

According to one exemplary embodiment as depicted in FIGS. 1 and 2, one or more document sources 12 provide one or more documents to a server 2. Although a single server 2 is depicted, it should be appreciated that multiple servers 2 may be provided and that such multiple servers may share data and operational tasks to achieve efficiency and operation of the functions described herein. Server 2 may select one or more documents (such as an image advertisement) and one or more evaluators 4 to rate the document. Server 2 may pass the one or more documents to one or more selected evaluators 4, or may otherwise make the document available to the one or more evaluators 4 for rating. For instance, one or more document sources 12, providers 8, and end-users 10 may also evaluate the document, and to this extent they may also be considered "evaluators" 4. Evaluators 4 rate the document(s) according to one or more criteria, such as sexual content and violent content. Evaluators 4 pass their rating information to server 2. Server 2 may approve, disapprove, or otherwise rate the document based on rating information received (or inferred) regarding that document. Server 2 may determine an aggregate rating for the document by processing all or a subset (one or more) of the document's associated evaluator ratings. For example, if a document is evaluated by ten evaluators, the aggregate rating may be based on any one of one through ten of the evaluators' ratings. For example, the aggregate rating may be based on the middle six, or some other combinations of evaluations.

One or more documents may be requested from server 2, or server 2 may transmit documents. For example, server 2 may transmit documents in response to a signal without human intervention. This action may be based on a number of factors. For instance, a provider 8 and/or end user 10 may request the document. The request may come in the form of a signal that the server interprets as a request for the document, even though the signal does not specifically indicate that a document is being requested. For example, an end user may transmit a signal to a server that requests a web page, and that signal may be interpreted as a request for an image advertisement document as well. The server 2 may determine whether any documents are available to respond to the signal based on one or more potential documents' rating and/or one or more criteria (e.g., whether the document meets or is related to content associated with the signal). Server 2 may pass one or more documents to a recipient, such as the requesting entity. The server 2 may identify other criteria associated with the signal (and/or the recipient of the document, if different from the requestor). While the criteria may be based on the content of the signal or request for a document (e.g., a search request for a keyword or the like), the criteria may also be based on preferences associated with the recipient. For instance, the server 2 may identify sensitivity information and/or suitability information associated with the requestor or recipient. If the recipient is identified with a preference against violent content, the server 2 may determine whether any available documents have a rating indicating low or minimal violent content.

FIG. 1 depicts an exemplary system 100 for rating an electronic document according to an embodiment of the invention. The system may comprise: a server 2, one or more evaluators 4, one or more providers 8, one or more document sources 12, an optical processor 6, an image file processor 7, one or more end users 10, and one or more databases 39 operatively connected to server 2.

System 100 may enable server 2 to request, receive, and/or process content ratings of electronic documents. Document sources 12, evaluators 4, providers 8, and end users 10 may communicate with one or more server 2 via electronic communication, including Internet communications. Document sources 12, evaluators 4, providers 8, and end users 10 may include or have access to one or more server 2 for providing functionality associated with electronic documents.

Information that may be communicated between and among server 2, evaluators 4, providers 8, document sources 12, and end users 10 may include one or more of the following: document information, content rating information, sensitivity rating information, suitability standard information, trust score information, and/or evaluator or provider information. The document information may include one or more of the following: the document itself, any language(s) used in the document, length information, file type information (e.g., html, doc, zip, etc.), type of document (advertisement, educational document), summary information, audio-visual content (e.g., pictures of faces, song lyrics, etc.), pornographic content, other offensiveness content (e.g., use of potentially offensive words), age-related content, the identity of the document owner and/or the document creator, information about the document's intended audience (such as geographic area, age range, gender, race, national origin, religion, other demographic information), and any other information related to a document or to the server 2, evaluators 4, providers 8, or document sources 12.

In particular, evaluators 4, providers 8, document sources 12, end users 10, optical processor 6, and image file processor 7 (collectively and individually, "rating entities") may provide server 2 with document rating information for one or more documents. For instance, the rating entities may receive a document, such as an image ad, from the server 2 (or provider 8) and then provide rating information about the document (and/or other documents referenced or linked to in the document) to the server 2.

Document sources 12 may provide documents to server 2 or server 2 may "pull" or retrieve documents from document sources 12. For instance, the document source 12 may provide an advertisement to server 2 so that the server 2 may then provide the advertisement to one or more content providers 8 that may provide the ad to one or more end users 10 (or server 2 may provide the ad directly to the end user 10). Document sources 12 may include any content creator or content provider 8, such as an advertisement listings provider or server 2.

Providers 8 may provide documents to one or more end-users, 10a through 10n. Providers 8 and evaluators 4 may include a content provider, search engine or other entity that makes available information, services, and/or products over an electronic network, such as the Internet. A provider 8 may include one or more of the following, for example: an advertisement listings provider, an electronic document provider, a website host, a server 2, any other entity that provides electronic documents to users or other entities, or any other provider of content. A provider 8 may be an evaluator 4 or a document provider 12.

An optical processor 6 may comprise one or more computers or data processors equipped with optical sensors. The optical sensors of the optical processor 6 may be equipped to identify and/or read optical data from the image of the document itself (e.g., from a photocopy of an image ad), and it may do so automatically (i.e., without human intervention). In other words, the optical processor 6 may "read" and process the image information of a document in a manner analogous to how a human's eyes and brain read and process text and images from a page of a newspaper.

In some embodiments, an optical sensor may first "read" a physical embodiment of the document and convert optical image data into a file (e.g., a .pdf file, .tiff file, or other image file format). The optical sensor may use a laser, scanner, or other optical reader to read data from the physical document. The optical processor 6 may then process the file. For instance, the optical processor may use OCR (e.g., OCR software or other software) to recognize or identify patterns in the stored optical data. Some types of OCR involve the translation of optically scanned bitmaps of printed or written text characters into character codes, such as ASCII.

By processing optical data from the image of the document, various optical scanning technologies may enable the optical processor to identify characters and images from the document. For instance, optical character recognition (OCR) technology (e.g., OCR scanners and software) enables an optical processor 6 to identify text characters in a document. For instance, OCR enables an optical processor 6 to distill the text of the newspaper by optically "reading" the newspaper. The distilled text may be stored in a file.

In processing the optical data of the image, the optical processor 6 may compare the image (or portions thereof) to other images (or portions thereof), e.g., images or portions stored in the content database 40. Specifically, the optical processor 6 may compare an image from one document source 12a to one or more documents from the same document source 12a already stored in the content database 40. For instance, the optical processor 6 may determine whether a document is identical to (or substantially identical to) another document. A "substantially identical" document may be a document that is determined to have content that is 90% identical (or 95%, 98%, or 99.5%, etc.) to another document. For instance, 90% of the text may be identical (90% of the words are identical, in an identical order), and/or the patterns defining the images of one document may be 99% identical to the patterns defining the images in another document. Other measures of "substantially identical" may be considered.

One document may be determined to have nearly identical text and images but different formatting, and the optical processor 6 may determine the (relative) equivalence of the two documents. For (substantially) identical documents, the optical processor 6 may indicate that the document is (substantially) identical to another document and identify the other document. If a first document is identified to be substantially identical to a second document already stored in the database, it may receive the same rating information as the first document.

Although traditional OCR technology is typically used to identify text, OCR and technologies similar to OCR may enable the optical processor 6 to identify one or more images in a document by optically "reading" the document. For instance, the optical processor may read an image and determine that the image contains a picture of a film projector, a bottle of beer, a person (in varying states of dress), or another object. The optical processor 6 may also determine other optical data relating to the image, such as image colors, color schemes, patterns, and other information. By using such technology, an optical processor 6 may determine an amount of human flesh (e.g., unclothed human flesh) appears in an image. Accordingly, an optical processor 6 may determine the amount or presence of text or images of drugs, alcohol, nudity, or other potentially offensive or inappropriate content. Based on this information, the optical processor 6 may rate the document (e.g., image) along these and other criteria. A sample rating by an optical processor is shown in FIG. 6.

An image file processor 7 may also identify and process text and images on a document. However, the image file processor 7 may do so by processing a computer file storing the document or image (e.g., a .pdf or .tiff file) rather than optically reading a physical embodiment of the document. Thus, the image file processor 7 operates in a manner similar to the optical processor 6, except it may not have an optical scanning component.

It should be understood that a single document may have one or more electronic embodiments and one or more physical embodiments. For instance, a single document may take the forms of a .pdf file, a .gif file, a .tiff file, a file of another format, a printed piece of paper, a photograph, another physical object, or a visual display on a screen or monitor. Thus, a single document may be passed from the server 2 to the rating entities (such as the optical processor 6 and image file processor 7) in an electronic format (e.g., .pdf format) or a physical embodiment (e.g., a printed document on a piece of paper). The optical processor 6 may determine rating information when a physical embodiment of a document is used, and the optical processor 6 or image file processor 7 may be used when the document is in electronic form. The optical processor 6 and/or image file processor 7 may be coupled to the server 2, or they may be a part of the server 2.

An advantage of using the processors 6, 7 to determine rating information is that rating information can be determined (e.g., automatically). Because the server 2 may receive and distribute thousands, millions, and/or billions of different documents, the transaction and administrative costs of manually reviewing each document may be prohibitive and/or expensive. The processors 6, 7 may provide a sufficient preliminary review of an image or other document to determine whether a document is approved (e.g., acceptable and appropriate) for general distribution or for distribution to one or more specific providers 8 or end users 10.

The processor 6, 7 may also inspect a link in a document (e.g., automatically in response to identifying the link). For instance, if an image ad document comprises one or more links (e.g., if the image ad displays a URL link on the ad, embeds a hypertext link, or otherwise enables a viewer to select an associated document, e.g., by clicking on a link), the processor 6, 7 may access the link and the linked document. If the processor 6, 7 is unable to access the link or linked document (e.g., if the processor's web browser fails to load the linked document or there is another error), the processor may report a "broken" link (e.g., automatically in response to identifying the "broken" link). For instance, the processor 6, 7 may report this information in its rating information.

An evaluator 4 may be a provider 8, a document source 12, an end user 10, an optical processor 6, an image file processor 7, and the server 2 itself. An evaluator 4 may be one or more persons, groups, and/or processors. The evaluators 4 and providers 8 may be partners of an entity associated with operating server 2. An end user 10 may be one or more persons, computers, computer networks, or other entity on a network. An end user 10 may request and receive content from a provider 8 and/or server 2. Additional participants may be included based on various applications.

The server 2 may comprise any server 2, hub, central processor, provider, search engine, or other entity in a network. A database 39 coupled to the server 2 may include one or more databases 39-54. Also, databases 39-54 may comprise portions of a single database 39. It should be appreciated that the databases 39-54 may or may not be physically distinct. The server 2 and its modules 20-36 may store and access information stored in the database(s) 39, 39-54.

A content database 40 may store documents and/or data related to the documents, such as portions, images, and text of documents. The documents may be rated and/or unrated. For example, the documents may or may not have rating information of a specific type associated with them. For instance, the documents may have rating information from a processor 6, 7, but not from an end user 10 or provider 12.

The documents may be received from document sources 12, evaluators 4, and providers 8, or they may be otherwise stored by the server 2. The content database 40 may identify documents of a certain type and/or group or otherwise associate documents together. For instance, documents may be identified and/or associated with other documents according to one or more of the following features: subject matter, content rating, aggregate content rating, sensitivity score, content type, language, geographic origin (e.g., country or city of origin), geographic area of target audience, document source 12, owner of content, creator of content, target demographic, or other criteria. For instance, the documents may be identified or grouped according to their offensiveness content, associated keywords, associated site (e.g., a site explicitly or implicitly linked from the document, such as through an embedded hypertext link), status of associated site (e.g., whether a link in a document is broken and/or points to an invalid URL), flesh content (e.g., state of undress of human images), pornographic or other prurient content, adult content, drug- or alcohol-related content, children's content, or target age, gender, race, national origin, or religion. Other factors related to matching content to an appropriate audience can be considered.

A content rating database 42 may store content ratings (aka "rating information") received from evaluators 4 and any other information that may be relevant to rating a document. For instance, the content rating database 42 may store information relating to number of clicks on a document, number of times a document has been provided, click through rate, number of times a document has led to a transaction (e.g., when a user clicks on a document and then purchases from a linked or otherwise associated site), feedback (e.g., feedback received from end users 10 or providers 12), information relating to complaint letters filed for a document, verification information (such as a content creator vouching for the appropriateness of a particular document), and third party or other determinations relevant to the content of a document. Each stored content rating may be associated with a particular evaluator 4 and a particular document (e.g., an electronic document). Each content rating may comprise one or more subject ratings (see FIG. 7). For instance, a content rating may include a rating for violent content and separate ratings for sexual content and drug-related content. If a document links to one or more other documents (e.g., links to a URL), content ratings of the linked document may also be included here. These separate ratings may or may not be combined into a single score (e.g., a single aggregate rating for a document). A document's content rating and/or aggregate rating may change as a new rating information for the document is received.

The content rating database 42 may also store a general approval status of a document and performance data related to a document. The approval status may be "approved," "disapproved," "suspended pending further review," or "un-approved." A document may have an approval status for a variety of criteria. The performance data may comprise a document's click-through-rate, feedback rating, number of feedback ratings, transaction rate (number of times the document has led to a transaction compared with how many times the document has been provided by the server 2 or selected by an end-user), and transaction volume, among other criteria.

A trust score database 44 may store trust scores associated with one or more evaluators 4, document sources 12, and content creators (collectively, "trust entities"). A single trust entity may have one or more trust scores associated with it. The single trust entity may have a different score for different types of content rating subject areas. For instance, a trust entity may have a high trust score with respect to age appropriateness ratings, but low trust scores with respect to violence ratings. An evaluator may also have different trust scores according to any of the following criteria: time (e.g., time of day, day of year), geographic location of evaluator, document recipient profile, size of evaluator entity, business area or industry of evaluator, prior evaluator rating consistency or accuracy, terms of agreement between the trust entity and server 2 (if any), and trust ratings of the trust entity by other evaluators 4b-4n. Evaluators 4 may be assigned a low trust rating when evaluating their own content. Such a rating may be assigned automatically in response to identifying that an evaluator is evaluating its own content.

Trust scores may be normalized or otherwise adjusted for one or more evaluators 4. For instance, trust scores may be adjusted to reflect that a trust entity consistently provides higher or lower ratings, e.g., ratings of a particular type (violence) for content of a particular type (ads). For instance, a trust entity may provide adult content ratings that are at least one standard deviation of the mean higher than the ratings of other evaluators 4b-4n in 80% of the evaluator's 4a ratings. This may indicate to the system that, on average, the evaluator's 4a adult score ratings are likely to be higher than average in future ratings, e.g., future ratings of a particular type for content of a particular type.

Other information can be determined, deduced, or inferred from the rating behaviors of one or more evaluators. For instance, if evaluator A provides a higher adult content rating for document XYZ than evaluator B, and evaluator B provides a higher adult content rating for document QRS than evaluator C, then the system might assume that evaluator A provides (or will provide) higher adult content ratings than evaluator C. As a result, the system may adjust (e.g., lower) the trust score for evaluator A (or B or C) in a future rating, such as a rating that includes an adult content rating from both A and C.

Similarly, instead of (or in addition to) adjusting the trust scores of evaluators, the ratings themselves may be normalized or otherwise adjusted, e.g., as described above for trust scores. For instance, for a particular trust entity who consistently provides high violence ratings compared to similarly situated evaluators' 4b-4g ratings of the same or similar content, the violence ratings of that particular trust entity for that type of content may be adjusted downward.

It should be noted that because evaluations may be requested and received from hundreds (or perhaps thousands or millions) of evaluators 4, biases and other rating behavior can be tracked and predicted for large numbers of users, content types, rating categories, and other criteria. Normalization and other statistical and/or data processing techniques can be used to process the data, as will occur to those skilled in the art. The processed data can be used to adjust ratings, trust scores, aggregate ratings, and other calculations and information.

A sensitivity database 46 may store sensitivity information for evaluators 4, providers 8, end users 10, document sources 12, the server 2, a specific document, or other sensitivity information. A sensitivity score may indicate the level of conservatism by which to aggregate content ratings. For instance, a high sensitivity score (e.g., 95%) may indicate that the aggregate rating should be aggregated very conservatively. A conservative aggregation might mean that if one evaluator 4a rated a document as inappropriate for children, then the aggregate rating will also indicate that the document is inappropriate for children, even if the "average" rating would indicate that the content is appropriate for all ages. A sensitivity score may be specified by a provider 8 and/or end user 10, or any other entity. For instance, a provider 8 may specify a very high sensitivity to violent content and to sexual content and a low sensitivity to age-related content. Thus, when the server 2 selects a document for that provider 8, the server 2 might select a document where none (or very few) of the document's evaluators 4 found any sexual or violent content, where the document may have content directed towards an audience of any age.

For instance, the sensitivity database 46 may comprise a record indicating that Provider A (or a particular end user 10a) has a sensitivity score of 55% for sexual content and a sensitivity score of 20% for age-related content.

An aggregate rating database 48 may store aggregate ratings. Each aggregate rating may be associated with the rated document as well as the evaluators 4 used to determine the aggregate rating. The aggregate rating may also be associated with one or more sensitivity ratings and trust scores. Each aggregate rating may include content ratings across a variety of criteria. The content of an aggregate rating is described further below with respect to the rating aggregation module 30. The aggregate rating database 48 may also store the approval status of a document.

An evaluator database 50 may store evaluator (and other trust entity) information. For instance, the evaluator database 50 may store information related to the trust score of a particular trust entity. The evaluator database 50 may store such trust entity information as the trust entity's name, address, country of origin, company size, prior content rating information, industry field, company reputation information, prior trust scores, and other information that may be related to a trust entity's trust score.

The evaluator database 50 may store information to enable the server 2 to identify a particular end user 10a or provider 8a. For instance, the evaluator database 50 may store static IP addresses of users who provided rating information for a document in the past.

A suitability database 52 stores information about providers 8 and end users 10 who may request documents. For instance, the suitability database 52 may identify the gender, age, name, country of origin, and other personal information about an end user 10 or other content requester. This profile would be different from another end user 10 who was a 62-yr-old male from Spain. Each user 10 and/or provider 8 might have a set of suitability standards associated with them and stored in the suitability database 52.

Other database(s) 54 may store other information relating to the evaluators 4, providers 8, end users 10, document sources 12, server 2, content ratings, aggregate ratings, trust scores, suitability scores, and sensitivity scores.

The server 2 may comprise one or more modules to process content, ratings, and other data.

A document selection module 20 may select documents to be rated, e.g., to be rated by one or more specific evaluators. The module 20 may select the documents stored in the document database 40. The document selection module 20 may select the documents randomly, or it may select documents with particular features. For instance, the document selection module 20 may select documents provided by a particular document source 12, documents rated by a particular evaluator 4, documents of a particular length or type (e.g., short advertisements or image advertisements). Documents may be selected according to subject matter, associated keywords (e.g., keywords typically associated with questionable content), financial data, performance data, geographic origin, identity of owner, identity of creator, and/or other information associated with the document.

For instance, documents that may be selected for review (e.g., manual review) may comprise documents with one or more of the following features: a sufficiently high flesh rating; a sufficiently high or low number of times the document was provided to providers 8 or end users 10; a sufficiently high or low number of times the document was selected (e.g., clicked on) by end users 10; a sufficiently high or low rating in one or more categories; a sufficiently high or low number of times the document was rated. If a document is associated with another document, any content-related considerations of the associated document may be a basis for review. For instance, if an image ad explicitly or implicitly links to the URL of a website, content considerations (e.g., a "rating" of the website) may be a basis for reviewing or disapproving the document. For instance, a document may be reviewed if the site is flagged for providing or potentially showing inappropriate content, or if the site is known to provide such content. Evaluators may report such findings via their content ratings (e.g., via feedback from an image ad).

Further, a document such as an image ad may be disapproved or marked for review if it links to a "broken" document. For instance, an end user may report via feedback that a link in a document does not effectively direct the end user's browser to the intended site (or to any site at all), or otherwise causes an error, such as a failure to properly load the linked document. A document may also be disapproved or selected for review if a provider 8 complains about the document (or document source 12) and blocks the document from its site.

Rated and un-rated documents may be selected for review. (It should be understood that "unrated" documents may comprise documents with no manual ratings; thus, unrated documents may comprise documents with ratings from the optical processor 6 and the image file processor 7.) For instance, an advertisement with a high click-through-rate (CTR) may be selected for rating before an advertisement with a low click-through rate. A document with more rating information (e.g., negative feedback) or conflicting rating information may have priority over documents with less rating information (or positive rating information). A web page from an alcohol distributor may be selected prior to an advertisement from a utensil manufacturer.

An evaluator selection module 22 may select evaluators 4a-4n for evaluating one or more electronic documents. Evaluators 4 and associated documents may be selected randomly or by other methods. For instance, evaluators 4 may be selected randomly from a group of evaluators of a specific type, such as a group of partner advertisers or advertising listing partners. Evaluators 4 may be selected according to any criteria, such as the trust score of the evaluator.

Unrated documents may be selected for rating prior to (or after) rated documents. Some evaluators 4 may submit some of the rate-able documents to the server 2. These evaluators 4 may or may not be selected to review the documents. In one embodiment, entities that provide rate-able content to the server 2 rate the content before providing it to the server 2.

A trust score module 24 determines trust scores for evaluators 4. A trust score of an evaluator 4 is a measure of the extent to which the evaluator's 4 content rating will be considered in determining an aggregate rating. For instance, the content rating of a highly trusted evaluator 4 may be given greater weight in the calculation of an aggregate rating than a less trusted evaluator 4. Trust scores may be determined according to any of the following factors related to an evaluator 4: evaluator name, company, size of company, location (and national origin) of evaluator, language of evaluator, reputation of evaluator, company industry, prior content ratings, number of prior content ratings, and a comparison between prior content ratings and an associated aggregate rating or associated content ratings by other evaluators.

A sensitivity module 26 may determine sensitivity scores for a provider 8, an end user 10, an evaluator 4, and/or the server 2. These scores may be based on information collected regarding those entities, such as prior rating data and any information stored in any of the databases 39. A high sensitivity might indicate a higher degree of conservatism in determining an aggregate rating. For instance, if a provider 8a has complained of receiving inappropriately violent content in the past, the sensitivity module 26 may associate a high violence sensitivity score with that provider 8a.

A content rating module 28 may create content rating requests and pass them to evaluators 4. An exemplary content rating request is shown in FIG. 7. The content rating request may comprise a list of information requested for a document to be rated. The content rating request may be the same or different for each document. Accordingly, the information requested may be different (or the same) for each document, such as for documents of a specific type (such as image ads or documents related to a specific type of keyword or industry). For instance, a request to rate a beer advertisement may request detailed information about the way beer/alcohol is portrayed, while a request to rate a power tool merchant's website might not. The content rating module 28 may also receive and process content ratings received from evaluators 4. The content rating requests and content ratings may be communicated via traditional mail, email, or other methods. For instance, the server 2 may send to an evaluator 4 a link to a server 2 website that contains the document and associated content rating information. The evaluator may then access the document and provide the content rating directly on the server 2 site. The content rating module 28 may then electronically process the rating information.

A rating aggregation module 30 may determine an aggregate rating for a document by processing one or more content ratings of the document received from one or more evaluators 4. The rating aggregation module 30 may use any aggregation algorithm or methodology. For instance, the aggregation may be a total score, a mean, a mode, a median, a step function, a $75^{th}$ (or other) percentile score, or any other measure that relates to the data considered. The algorithm may consider one or more of the following, for example: content ratings, sensitivity information, suitability information, trust score information, document performance data (such as click through rate and frequency of display), and other information relevant to the evaluators, document, document content, or aggregation. For example, in one specific iteration, the rating aggregation module 30 may mark a document as violent if any content ratings indicated any violence whatsoever. This may occur when a high sensitivity to violence is incorporated into the algorithm. Another algorithm may determine a high violence score only if a supermajority of evaluators 4 rated the document to have strong violence. The algorithm may weight the ratings of different evaluators differently according to each evaluator's trust score (if any). For instance, a highly trusted evaluator's violence rating may count three times as much as a less trusted evaluator's violence rating. The algorithm may also discount the ratings received from processors 6, 7. Other examples are also possible.

An aggregate rating may comprise one or more distinct numerical scores (e.g., for different subject areas like sexuality and violence) and/or one or more verbal scores. A verbal score may be a word (e.g., essay) analysis of a feature of the document. For instance, an evaluator may provide a numerical score of 4/10 in a "sexual content" category, and the evaluator may also verbally state that the document "includes a half-clothed woman with a sexually suggestive look in her eye." It may also comprise one or more binary scores (such as yes/no or flag/no-flag). For instance, if three of five evaluators flagged a document as pornographic in their content rating, the rating aggregation module 30 may flag the document as pornographic. The numerical scores may comprise one or more measures of a total rating in a particular subject area, and the numerical scores may also indicate other information about the various ratings aggregated. For instance, a score may comprise a mean in addition to a standard deviation of the mean. The aggregate rating may comprise a multidimensional vector coupled with verbal responses.

Rating aggregation module 30 may also determine that particular documents may be subjected to additional review. For instance, if a less trusted evaluator marked a document as pornographic, the document may be marked for further review (such as by manual review by the server 2 or its agents). The rating aggregation module may update aggregate ratings (e.g., automatically) at specific times or as new ratings are input into the system.

Rating aggregation module 30 may also suspend, disapprove, or otherwise change the rating or status of a document that is flagged for review by document selection module 20.

A suitability standard module 32 may identify or determine suitability standards of document recipients such as providers 8 and end users 10. The suitability standards may be based on provider 8 or user 10 information, such as the information described above. The suitability standards may be identified by the suitability standard module 32. For instance, a suitability standard for a user identified to be a twenty-year old male viewing a pop musician's website might indicate that a small amount of violent and sexual content may be appropriate for the user, but that alcohol-related content is not. The suitability standard may be used to select a document appropriate for that user.

When server 2 attempts to select one or more documents for potential delivery to a requesting service provider 8 or end user 10, the suitability standard module 32 may attempt to determine whether any information relating to the preferences of the provider 8 or end user 10 are stored in the suitability database 52. If a suitability standard exists for a potential content recipient, the document provision module 34 may select a document that satisfies the suitability standards (e.g., a document that contains very little violent content). A similar, but slightly different, method of identifying appropriate content may be accomplished using sensitivity scores, as described herein.

A document provision module 34 may select and provide documents in response to a request from a provider 8, end user 10, or other entity. For instance, a children's book retailer may request an advertisement to display on their site. In response, the document provision module 34 may identify or determine sensitivity score information and suitability information associated with the children's book retailer and then select a document based on this information (such as an identified suitability standard). For instance, if the site is associated with a high sensitivity to violent content, the document provision module 34 may select content that has an aggregate rating indicating zero violent content. The document provision module 34 might also select a document that was verified by a trusted evaluator to have no objectionable violent content.

Document selection may be based on the aggregate rating (or a content rating) associated with the document, as well as suitability and/or sensitivity information. For instance, the document provision module 34 may determine that the provider 8 (or end user 10) has a high sensitivity against prurient content and therefore select a document where no evaluator found pornographic content—or where no evaluator found sexual content of any kind. The document provision module 34 may also determine that the provider prefers documents with an aggregate rating that indicates a high value in the category of child content and therefore select a document containing substantial children's content.

By identifying a suitability and/or sensitivity score for particular providers 8 and end users 10 (or other entities that receive documents), a document may be chosen that fits a suitability profile (or standard) associated with that entity. Thus, end users may receive non-offensive content, and content providers may ensure the propriety of the content provided on their sites.

In some embodiments, the document provision module 34 may select and provide "approved" documents. An approved document may be any document that has a sufficiently high or otherwise acceptable aggregate rating or sufficiently high content rating in any of a variety of content areas. For instance, in some embodiments an approved document may be any document with a rating indicating general approval for all audiences. In some embodiments, an approved document may be any document with no negative ratings (or no ratings). For instance, for image ads with a means for providing rating information such as feedback (see FIG. 4), an approved document may comprise documents with no feedback.

The document selection module 34 may select documents based on the recipient of the documents. For instance, if the recipient is a male, the document selection module 34 may select a document that is associated with male audiences.

The document selection module 34 may identify recipient information, e.g., by inspecting "cookies" on an end-user's computer. For instance, the document selection module 34 may identify preferences of an end user 10 based on prior information received from the end user, such as rating information for a prior provided document. Information enabled or identified by the document selection module may be stored in the evaluator database 50.

An optical data module 35 may pass information to and from the optical processor 6. The optical data module 35 may receive optical data and process the data to determine rating information (as described above for the optical processor 6 itself), and/or it may merely receive and process rating information determined by the optical processor 6. The optical data module 35 may convert this data into a format readable by the other modules 20-38, as necessary.

A file data module 36 may pass information to and from the image file processor 7. The optical data module 35 may receive optical data and process the data to determine rating information (as described above for the optical processor 6 itself), and/or it may merely receive and process rating information determined by the image file processor 7. The optical data module 35 may convert this data into a format readable by the other modules 20-38, as necessary.

Collectively, the optical data module 35 and file data module 36 may handle the rating of documents such as image ads or other documents containing images. When the server 2 receives a new or modified document (or request to modify a document) from a document source 12, the modules 35, 36 may cause the document to be processed and rated as described above. In this way, a rating can be automatically obtained for each document as it is received by the server 2 (or generated by the server 2). Manual ratings for selected documents can also be obtained as described above, e.g., through the document selection module 20.

Other module(s) 38 may accomplish other functions related to rating electronic documents.

Illustrative System Network Environment

FIG. 2 depicts a networked environment for operation of a system for rating a document according to an embodiment of the invention. In such an environment, evaluators 4 and providers 8 may connect over a network 14, 15 to a server 2 (e.g., using a secure https connection) to provide documents and rating information to server 2 and to receive documents and rating request information from server 2. The server 2 may store the document and rating information in a database 39. The server 2 may distribute the documents through various forums or feeds, including direct distribution in print media, providing the documents on one or more web sites affiliated with the server 2 and through providers 8. It should be noted that providers may comprise syndication partners of the server 2 (e.g., connected over network 14 or 15 depending on security desired), content systems (e.g., with associated content databases) and search engine systems operated by the server 2 or provider(s) 8.

Through these various forums, the documents provided to the providers 8 may be included in pages (or other documents) displayed to end-users 10 (often called an impression).

Each of server 2, evaluators 4, providers 8, and document sources 12 may comprise computerized systems that include one or more of the following systems: a web server 2, a database server 2, proxy server 2, network balancing mechanisms and systems, and various software components that enable the system to operate on the internet or other network type system. Additionally, networks 14 and 15, although depicted as http networks, may comprise other networks such as private lines, intranets, or any other network. In an exemplary embodiment, the connection between a document source 12 such as an advertisement provider and server 2 (and other connections such as between a provider 8 and server 2) may comprise secure network connections to insure that data is not subject to attack or corruption by any hacker or other third party. In addition, whereas two evaluators 4 and two document providers 12 are depicted, it should be appreciated that one or more evaluators 4 and one or more document providers 12 may be provided in the network. Similarly, although one database 39 is depicted, it should be appreciated that multiple databases 39 may be provided and that such databases 39 may be connected to the server 2 via any type of network connection, including a distributed database server 2 architecture.

Similarly, provider 8a may comprise any number of such systems connected to the evaluator 4 or server 2 via any type of network, including an http or https network. Content provider 8 may comprise a system such as server 2 that provides functionality for enabling connection over the internet or other network protocols. End users 10 may comprise any user (such as users connected to the internet) and may comprise computerized systems that enable that connection through any of various types of networks, including through internet service providers, cable companies, and any other method of accessing data on the internet. Providers 8 may comprise any system that distributes content such as advertising to end-users 10.

Illustrative Process

Figure 3:
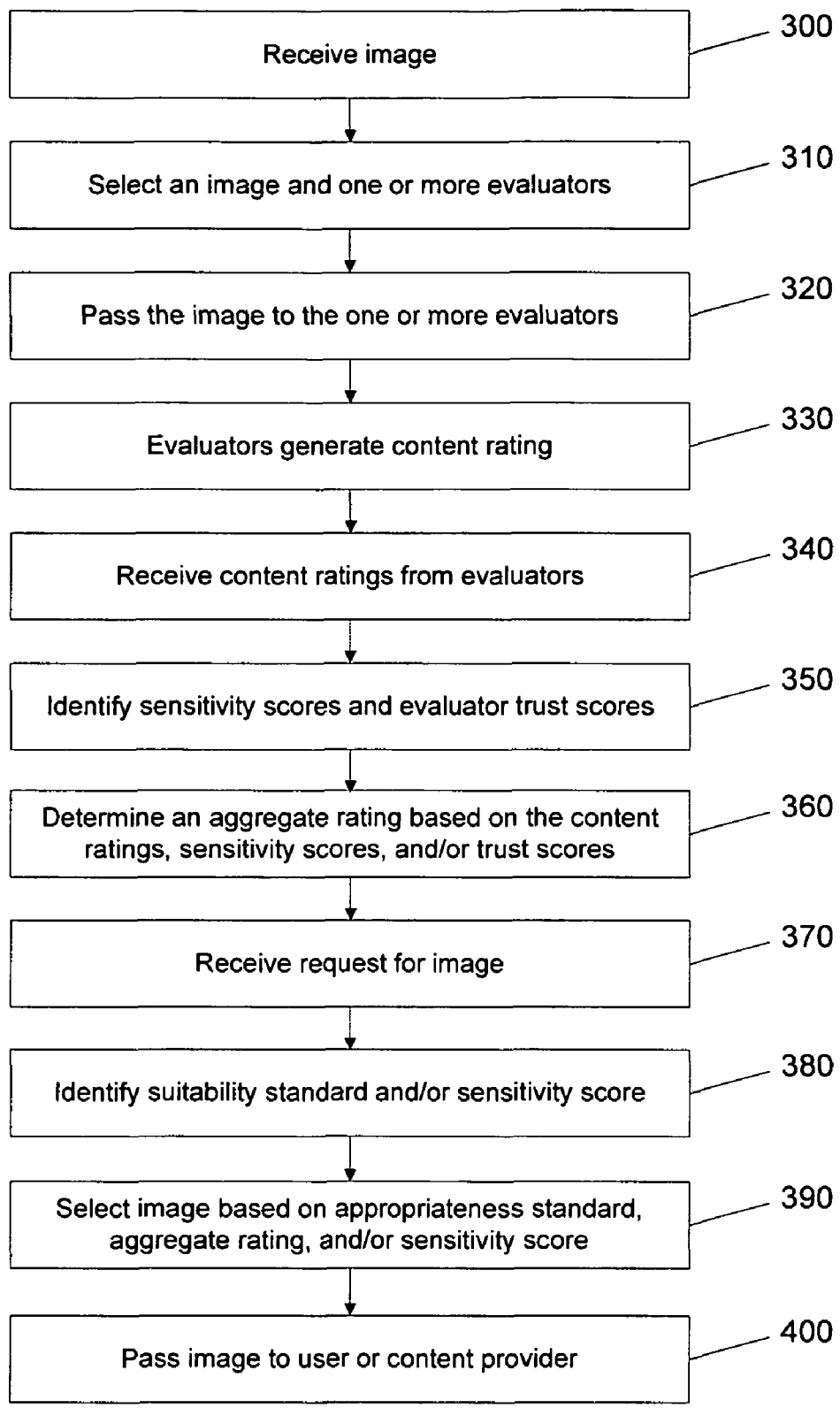
FIG. 3 depicts a flow chart illustrating an exemplary method for rating an image according to an embodiment of the invention.

FIG. 3 is a flow chart illustrating an exemplary method for rating an electronic document according to an embodiment of the invention. The method described herein may be implemented by the systems described in FIGS. 1 and 2.

In block 300, one or more documents may be received. For instance, the server 2 may receive one or more advertisements from one or more partner advertisers or other content providers. Alternately or in addition, the server 2 may generate one or more documents.

In block 310, the server 2 may select one or more documents to pass to one or more evaluators. For instance, the server 2 may pass the document to one or more partner advertisers or content providers, in which case these entities may be evaluators. These evaluators may be the same or different entities from which a document was received in block 300 (i.e., the server 2 may select the original provider of the document (from block 300) to be one of the evaluators in block 310).

The server 2 may select the documents and evaluators randomly or based on an algorithm and/or one or more criteria. The document may be selected from among a plurality of documents, and the evaluators may be selected from among a plurality of evaluators. It should be understood that while this description discloses the method of rating an electronic document, many documents can be rated using this method at the same time. For instance, as each additional document is received by the server 2, the documents may be passed to one or more evaluators (automatically) selected by the system. The documents may be selected by the document selection module 20 as described above.

In block 320, the selected document (or link to the selected document) may be passed to the one or more evaluators. For instance, the server 2 may pass the document to one or more partner advertisers who will rate the document. The server 2 may also transmit rating instructions to the evaluators 4 that describe the various ratings requested for the document. The rating instructions may provide a link (e.g., a feedback link) which directs the evaluator to a site that prompts the evaluators for specific rating information. The linked site may also include means for obtaining or viewing the document itself. For instance, the server 2 may request each evaluator to rate the document according to a variety of criteria such as target age range, family content, violent content, and other criteria.

The server 2 may also pass the document to end users (directly or indirectly through providers) who may (or may not) rate the document. The document itself may have built-in means for evaluation. For instance, image ads may have "feedback" links for providing rating information. An end user who receives the image ad (or other document with means for providing rating information) may then rate the document. In such a scenario, evaluators need not be selected in block 310, as any recipient of the document may be a potential evaluator.

In block 330, the evaluators may generate one or more content ratings (aka "rating information") associated with the document. For instance, a partner evaluator may have an one or more evaluator employees or agents review the document and rate the document in each category specified by the server 2. The content ratings may be numerical scores (e.g., a number between 1 and 5, or another number or percentage), codes (such as "V" for violent), or verbal comments (e.g., essay responses).

For instance, an end user or other evaluator may elect to provide rating information by clicking on a feedback link. The feedback link may direct the evaluator to a site (or other location in cyberspace) where the evaluator may provide rating information. For instance, the feedback link may direct the evaluator to a site which prompts the evaluator for various rating information (see, e.g., FIG. 7). Rating information may be input at the prompts.

It should be appreciated that documents may be rated by a processor, e.g., as described above for the optical processor 6, image file processor 7, and optical and file data modules 35, 36. If a document is rated automatically, blocks 300-330 may all occur automatically and at substantially the same time. If the server 2 rates the document itself, e.g., via the optical or file data modules 35, 36, it need not "receive" rating information from an evaluator in block 340.

In block 340, the content ratings may be received from the evaluators. For instance, the content ratings may be received by the server 2 from the partner advertisers or from end users via a feedback link.

In optional block 350, sensitivity ratings and evaluator trust scores may be identified. For instance, the server 2 may identify trust scores associated with one or more of the evaluators that submitted content ratings for the document. Trust scores may be determined and identified as described for the trust score module 24 of FIG. 1, and sensitivity scores may be determined and identified as described for the sensitivity module 26 of FIG. 1.

In block 360, an aggregate rating may be determined. The aggregate rating may be based on one or more of content ratings, sensitivity scores, and trust scores. The aggregate rating may be determined by any method as described above for the rating aggregation module 30 (see FIG. 1). The aggregate rating may comprise a general approval or disapproval.

In block 370, a request for a document may be received. For instance, the server 2 may receive a request for a document from a provider 8 or an end user 10. In block 380, a suitability standard and/or a sensitivity score may be determined.

In block 390, a document may be selected. For instance, a server 2 that receives a request for a document from a user or provider may select a document for the user or provider. The selecting may be based on a suitability standard of the user or provider, one or more aggregate ratings of the document, and/or sensitivity scores associated with the evaluators, server 2, provider(s), and/or user(s).

In block 400, one or more selected documents may be passed to the requesting entity. For instance, if a provider or user requested a document in block 370, the server 2 may pass the selected document to the provider or user, as the case may be.

It will be appreciated to those skilled in the art that the acts described may be performed by hardware, software, or a combination thereof, with or without human intervention, as may be embodied in one or more computing systems such as a server 2 system coupled to entities such as providers, evaluators, and end users. Further, it should be appreciated that not all of the blocks must be accomplished. For instance, in one embodiment, the method may begin at block 340 and end at block 390. Also, it is not necessary that the action(s) of each block be performed in the order shown in FIG. 3. Any order of performance may be considered.

It should be noted that the aggregate content rating may be determined after a user or content provider requests a document from the server 2 rather than before such request. Because sensitivities, suitability standards, and evaluator trust scores may change over time, and because new ratings may be added for a particular document, the document's aggregate rating may also change. Obtaining an up-to-date rating for a document before providing it to a user or provider may maximize the likelihood that the document is appropriate for the user or provider.

Illustrative User Interface and Results

Figure 4:
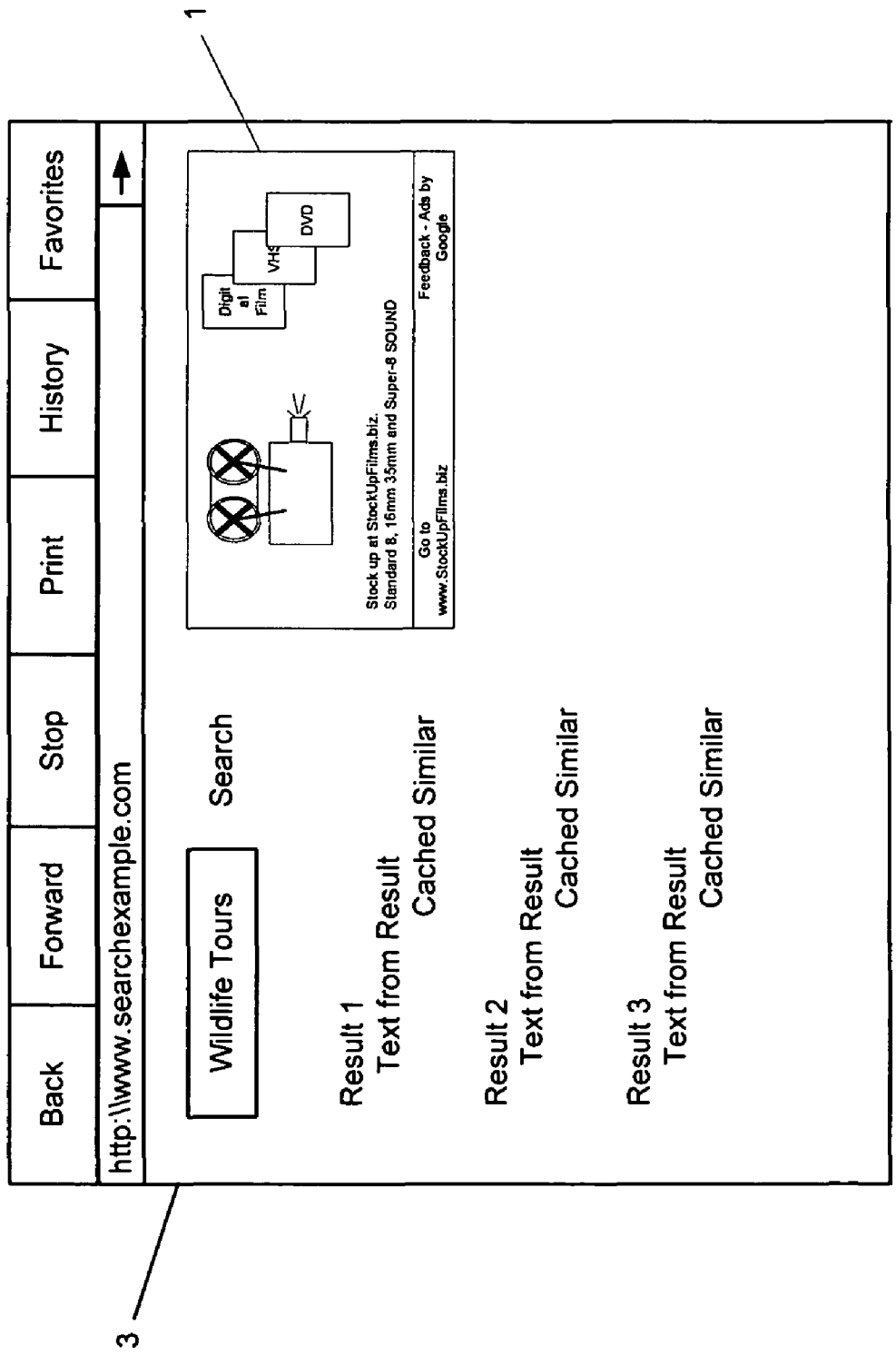
FIG. 4 depicts an exemplary document according to an embodiment of the invention.

FIG. 4 shows an exemplary document 1 according to an embodiment of the invention. FIG. 4 depicts an exemplary web page 3 search result from an internet search engine. The web page 3 itself may be a document. Content on the web page 1 may also be a document. For instance, advertisement 1 on the search result page 3 may also be a document. Other types of documents may be considered, such as advertisements, files, programs, and other information.

The document may have various types of content. For instance, the document may have words, images, sounds, and other information, as well as functions or programs which may dynamically produce words, images, sounds, and other information. Each document may have different amounts of various types of content, such as sexual content, violent content, drug or alcohol-related content, financial content, adult-related content, child-related content, and other content.

Figure 5:
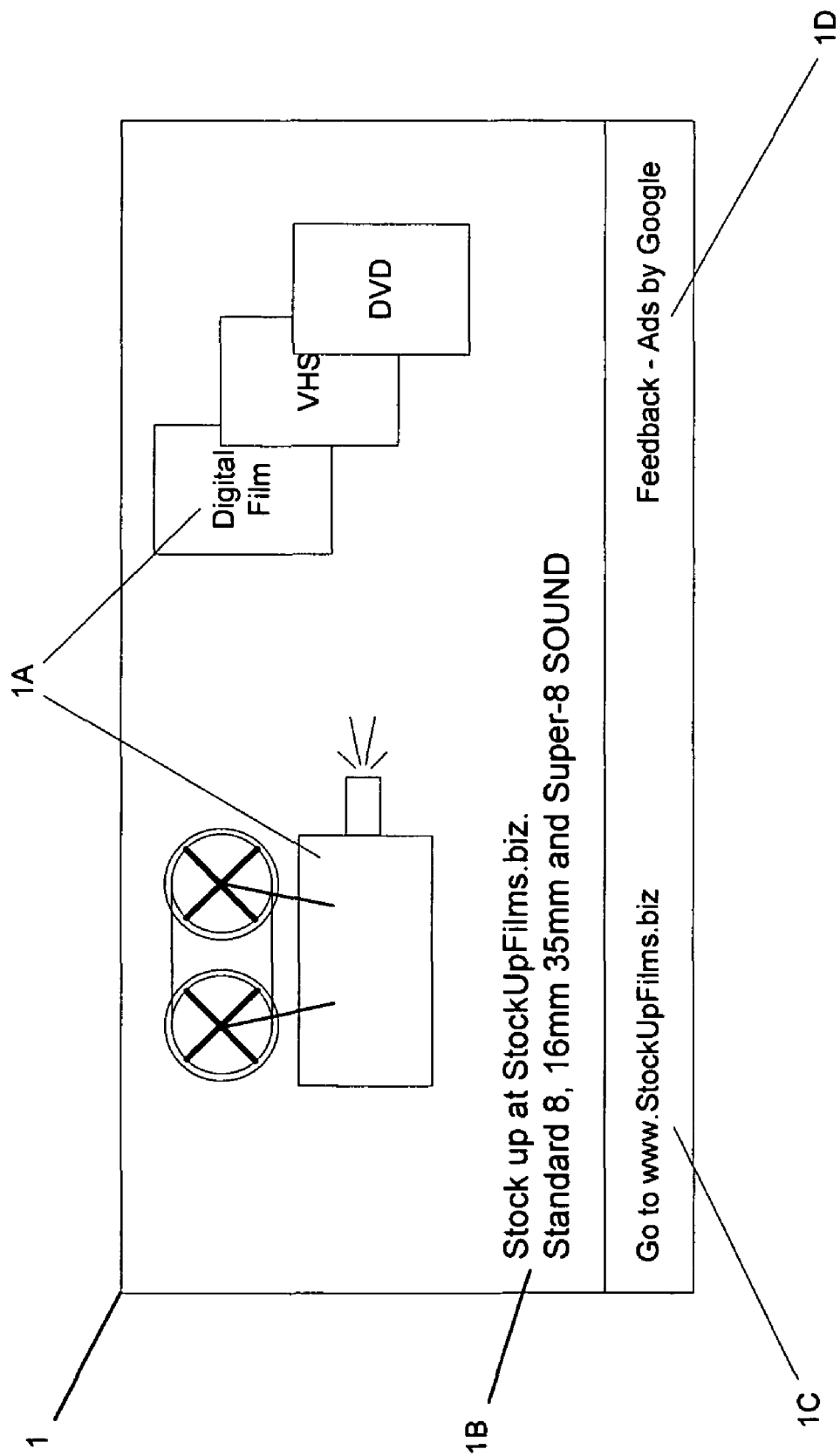
FIG. 5 depicts an exemplary image according to an embodiment of the invention.

FIG. 5 depicts an exemplary image advertisement document 1 according to an embodiment of the invention. The image ad 1 may comprise a banner ad, another ad that can be displayed on a web page, or another graphical advertisement that can be displayed via electronic means. The image ad 1 shows specific images 1A, ad text 1B, one or more links 1C, and a mechanism ID for rating the document 1. The specific images 1A comprise a film projector and images of a DVD, VHS, and digital film container. The text 1B comprises an advertisement message, e.g., a description of a product or service, a suggestion to a potential customer, and/or other advertising text. The link 1C may comprise a link to another document, such as the web page URL of the advertiser. For instance, the link 1C may comprise an embedded hypertext link, and the embedded link may be associated with the link 1C displayed in the image of the document 1. In some embodiments, selecting (e.g., clicking on) the displayed URL or other link while viewing the document 1 (e.g., in a web browser) may direct the viewer's mechanism for viewing documents (e.g., web browser) to the content associated with the link (e.g., the advertiser's web page).

The document 1 may explicitly display the link 1C. Alternately, the link 1C may be embedded in the document (e.g., in the programming of the document) or a portion thereof such that the link 1C is not visible. Here, selecting (e.g., clicking on) the document 1, an image 1A, text 1B, or another portion of the document may direct a user's document viewing mechanism to the linked document(s). The document 1 itself, images 1A, and text 1C may also comprise one or more links 1C. For instance, an ad that advertises a plurality of products may comprise a link for each product, wherein selecting (e.g., clicking on) an image 1A, icon 1A, or text 1B relating to a specific product may direct a web browser (or other document viewing mechanism) to a page at a merchant's site associated with the specific product (or to another document).

The mechanism ID may comprise a link for providing rating information. For instance, selection of the mechanism ID (e.g., clicking on the link ID) may direct the document viewer to an email or web page where the user may provide rating information. For instance, the web page may comprise prompts for providing rating information or otherwise request rating information. Other mechanisms ID for providing a communication link between an evaluator 4 and server 2 may be contemplated herein.

FIG. 6 depicts an exemplary document rating 600 according to an embodiment of the invention. The document rating 600 may be automatically generated, e.g., by the optical processor 6, image file processor 7, optical data module 35, or file data module 36. The document rating 600 may comprise information relating to the content, performance, or other characteristic relating to the document. For instance, the document rating 600 may comprise any of the following information: document text (e.g., text identified by OCR); descriptions of document image(s) (e.g., images identified by processor 6, 7); content keywords associated with the text and/or image(s); amount of flesh (e.g., un-clothed human flesh) detected in any image(s); amount of potentially inappropriate content (e.g., organized by type of inappropriate content such as alcohol and violence); trust score information; feedback information such as amount and content of feedback; performance data of document such as click-through-rate; general rating; and any other rating- or document-related information (e.g., as mentioned herein). The performance data for a document may be obtained from the content rating database 42.

Another document (e.g., an image ad) may display a picture of a bikini-clad woman holding a glass of wine and an associated title stating "Fun in the sun with WineCo brand wine." Another document may show a man holding a gun pointed at an icon that says "debt." Another document may state "investments with FundCo yielded 6.25% over prime last year." Another document may show children dancing underneath a rainbow and singing "It's a Small World After All." Another document may have an icon which, when clicked, allows the user to virtually duck hunt by using a cursor to aim a rifle at ducks sitting in a lake, as in a video game. Each document, such as an ad, may also comprise a swatch at the bottom of the ad that explicitly lists the URL (e.g., in text characters) of the site that would be accessed if the ad (or a portion thereof) was selected (e.g., clicked through a user device). Further, the swatch (or another portion of the document) may comprise a graphic or text indicating the source or sponsorship of the document.

FIG. 7 shows an exemplary content rating request 700 ("feedback questionnaire") according to an embodiment of the invention. The content rating request 700 may comprise one or more requests for specific ratings 701-703 across a range of subject matter and content types. For instance, there may be requests for ratings for violence 701, teenage appropriateness 702, country-specific suitability considerations 703, and other information. For instance, a content rating request might ask the evaluator to provide a number (e.g., a number between 1 and 10) indicating the amount of sexual content, violent content, adult content, language- or country-specific content, or other types of content or criteria. The request may also request information regarding when (time of day, week, year) the document is most suitable for viewing. The request may also ask the requestor to explain reasons for the requestor's numerical ratings or provide other verbal ratings.

FIG. 8 shows an exemplary content rating 80 (a feedback questionnaire completed in whole or in part) according to an embodiment of the invention. The content rating 700 may comprise one or more subject area content ratings 81-83 for the document, such as ratings for violence 81, teenage appropriateness 82, and country-specific suitability considerations 83, and other information. The content rating may include one or more responses to the content rating request (see FIG. 7). The content rating may indicate numerical or verbal ratings across a variety of criteria, such as sexual content, violent content, adult-themed content, culture-specific content, or other content criteria.

In practice, the server 2 may receive a plurality of image ads or other documents from document sources. The server 2 may rate the documents, e.g., via a processor 6, 7, as it receives each image ad. The rating may screen the image ad for potentially offensive content such as pornography, offensive words, and potentially offensive linked sites. For instance, it may only approve ads that are not determined to have such offensive content.

When a provider (or end user) requests a document such as an image ad, server 2 may provide an image ad in response to the request. Server 2 may select an approved image ad according to its content, suitability, identity of the requester, performance of the image ad, and other factors. For instance, if a user's request is associated with one or more keywords, the server 2 may provide an image ad associated with one or more identical or similar keywords (e.g., keywords closely related in semantic space). For instance, if the user searches for the word "airline" on a search engine and requests a search result document, the server 2 may provide a search result with an image ad related to the word "airline".

Evaluators 4, such as end users 10, may provide feedback through a feedback link, which may be a part of an image ad. For instance, if the ad contains offensive content such as a portrayal of extreme violence, an end user may click on the feedback link and provide feedback indicating such content (e.g., by rating the document as having significant violent content). The server 2 may receive the rating information and change the rating of the image ad accordingly.

Server 2 may also request review of a document, stop providing the document (e.g., to one or more providers or to one or more end-users such as children), change or suspend the distribution of a document, or otherwise change the status of a document based on the document's rating and/or performance information. For instance, as described above, the server 2 may stop providing the image ad or request further review of the ad if the rating (e.g., aggregate rating or one or more specific content ratings) of the ad indicates inappropriate or offensive content. This may also occur if a specific provider 8a blocks the document from distribution through that provider 8a, or if an evaluator 4 requests additional manual review (e.g., through the feedback mechanism). As for performance information, if a document has a sufficiently low (or high) click-through-rate, transaction volume, or other performance characteristic, the server 2 may request manual review of the ad or otherwise change the status of the ad. For instance, the server 2 may request one or more additional evaluators 4 to review the document if the document has a low click-through-rate. Documents with undesirable performance characteristics (e.g., low click-through rate) may be disapproved for distribution to end users. In this case, they may be disapproved not because of inappropriate content but because of its poor ability to generate end user 10 interest or revenue.

Server 2 may request manual review for any reason. For instance, server 2 may request some limited manual review of a document as a matter of course, regardless of rating. Server 2 may also request manual review depending on the trust score of the document source 12 or another factor.

Before a document is rated (or before there is enough rating information to determine a sufficiently reliable rating of the document), a document may be classified as "unapproved" or "not yet approved." These may be documents that have been received from document sources 12 or they may be documents generated by the server 2 that have not yet been rated (or only rated by a processor). For these documents, the content rating database 42 may indicate that the document's rating is "unapproved," "undetermined," "pending review," or "preliminarily approved," or the like. The documents may still be passed to end users 10 (e.g., via a provider 8), e.g., in order to obtain rating information (e.g., feedback) about the document. However, the provision of the document may be limited due to its uncertain status. For instance, the document may not be provided to specific users 10a or providers 8a, such as children 10 or non-partner providers 8. After obtaining rating information and/or determining an aggregate rating for the document, the server 2 may pass the document to users 10 based on the user 10, the request, user information, provider information, and/or document-related information. For instance, an image ad containing sexual content may be selected and passed to an adult user in response to a request to view an adult website.

The documents may contain a feedback mechanism ID. After the document has been viewed a number of times (e.g., 5000 times) without receiving any feedback (or a specified amount of negative feedback, such as none), the document may be classified as approved or fully approved (e.g., "approved for all audiences"). Such documents may be passed to end users 10 without restriction. Further, the feedback mechanism 1C may be removed from the document (e.g., because it is deemed unnecessary), or the content of the document may be otherwise amended.

To obtain review(s) (e.g., further manual review) for documents identified as needing further review, the server 2 may select one or more documents and one or more evaluators 4 to review the one or more documents. For instance, of 100 documents requiring manual review the server 2 may select five for manual evaluation, and then it may select three raters to rate each of the five documents. (Also and/or alternately, it may send the five documents to a plurality of selected evaluators 4 so that each document has three evaluators 4, but each of the evaluators 4 does not have all three documents.) Server 2 may send an evaluation request with each document. Also, the server 2 may post the documents and evaluation requests (e.g., evaluation forms) in a database (e.g., in database 6 and/or on a website) and enable the evaluators 4 to access the database and provide content ratings.

For instance, one content rating 80 of the document with a bikini-clad woman and glass of wine by one evaluator may show a rating of 6 out of 10 for sexual content, a 4 out of 5 for alcohol content, an indication that the document is suitable for children, and the rating may include an indication that the document is most suitable between the hours of 7 p.m. and 6 a.m. A content rating from a second evaluator for the same document may indicate a rating of 7 out of 10 for sexual content, a 3 out of 5 for alcohol content, an indication that the document is suitable for children, and an indication that the document is most suitable between the hours of 4 p.m. and 6 a.m. A content rating from a third evaluator for the same document may indicate an 8 out of 10 for sexual content, a 3 out of 5 for alcohol content, an indication that the ad is not suitable for children, and an indication that the document is most suitable between the hours of 11 p.m. and 6 a.m., and not on holidays.

Server 2 may calculate an aggregate rating for this document based on the three ratings. The server 2 may specify a high sensitivity for children's content and a medium sensitivity for violent content. The server 2 may calculate an aggregate rating for sexual content based on a mean (or median) of the three sexual content ratings, which in this case would be 7 out of 10. The server 2 may calculate an aggregate rating for alcohol content based on a mode (most common score) of the alcohol ratings, which in this case is 3 out of 5. Also, the server 2 may discount the first evaluator's rating of 4 out of 5 if the first evaluator has a low trust score, and a weighted average of the three ratings might be 3.1 out of 5 (which may be rounded to 3). Because the server 2 applies a high sensitivity to children's content, it might determine that the document is not suitable for children because one of the raters indicated that the document was not suitable for children. The server 2 may select the time of day rating of the most trusted evaluator. If the evaluator who indicated that the most suitable hours were between 11 p.m. and 6 a.m., the aggregate rating may indicate that the most suitable hours are between 11 p.m. and 6 a.m. The aggregate rating may also indicate the standard deviation for each component of the aggregate rating, or it may use some other measure to indicate the variance of the different ratings from the different evaluators.

If any of the three ratings was significantly different from the aggregate rating, the rating may be marked for further review. For instance, since only one evaluator indicated that the document is not suitable for children, the server 2 (or agent of the server 2 or another evaluator) may review the document to determine whether the unusual rating was accurate. For instance, the server 2 may review the evaluator's ratings and/or generate (or request) one or more additional ratings for the document. Depending on the results, the server 2 may change the aggregate rating (e.g., by re-calculating it) and/or change the trust score of the evaluator in question for one or more criteria of content.

Aggregate ratings of other documents may also be determined. For instance, the ad with children singing under a rainbow may be rated to have zero sexual content, zero alcohol content, zero violent content, and suitability for any time of day (especially 8 am-6 pm).

An end user or provider may then request a document at midnight. For instance, a client may click on a provider's web page, and the provider may request an advertisement to display to the client on the provider's site. The server 2 may select a document to pass to the provider according to the aggregate content ratings of the various documents. In order to select an appropriate document, the server 2 may also identify sensitivity and suitability information of the requesting provider (or user) and consider other criteria, such as time of request. For instance, the server 2 may identify that the provider has a high sensitivity to sexual content. (In another example, the server 2 may identify (e.g., by using cookies or information stored in a database associated with the user's IP address) the age and gender of the user (e.g., 25 year old male). The server 2 may have assign sensitivity or suitability criteria, e.g. for the time of day. For a request at midnight, the-server 2 may assign lower sensitivities to sexual and violent content than the middle of the day, since it is far less likely that children will be browsing the internet at that time. The relevant time may be from the perspective of the server 2, provider 8, or end user 10.

The server 2 may accordingly select a document that is suitable for a provider who has a high sensitivity to sexual content and a medium sensitivity to violent content. The server 2 may consider for selection all or a portion of documents stored in a database, including the bikini/wine document, the singing children, and the duck hunting documents. For instance, the server 2 may consider only those documents which have an aggregate rating indicating little or no sexual content and only mild (or less) violence. In the middle of the day, the server 2 might apply a high sensitivity to violent content due to the time of day and may therefore only consider non-violent documents at that time. At midnight, however, the server 2 might consider other documents that may not be appropriate to users at an earlier time.

The server 2 may then search for a document that fits the various criteria associated with the document request and the relevant sensitivity and suitability information. Although the image of children singing may have no offensive or potentially offensive content, it also may have a low click through rate and therefore not be selected. It should be noted that documents which have little or no potentially offensive content may or may not be favored over documents which do contain potentially offensive material. Here, the duck hunting document may be selected if its aggregate rating indicates only mild violence. The selection of this document may be more likely if it is an ad with a high click through rate. Other factors of document selection may be considered.

It should be understood that the server, processors, and modules described herein may perform their functions (e.g., reading optical information or determining rating information) automatically or via an automated system. As used herein, the term "automatically" refers to an action being performed by any machine-executable process, e.g., a process that does not require human intervention or input.

The embodiments of the present inventions are not to be limited in scope by the specific embodiments described herein. For example, although many of the embodiments disclosed herein have been described with reference to advertisements, the principles herein are equally applicable to documents and other content. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed is:

1. A computer-implemented method for rating a document comprising an image, the method implemented by a server system and comprising:
   receiving a document for distribution to an end user computing device, the document comprising an image;
   storing the document in memory;
   receiving rating information associated with the document from two or more rating entities, wherein at least one of said two or more rating entities comprises a processor to determine content of the image and generate rating information associated with the image based on the determined content;
   determining an aggregate rating for the document by aggregating the rating information; and
   approving the document, using one or more processors, for distribution from the memory to an end user computing device based on the aggregated rating information.

2. The method of claim 1, wherein the document comprises at least one of a web page, content that can be used in a web page, and a program.

3. The method of claim 1, wherein the processor comprises an optical reader, and the processor determines content of the image and generates rating information through the acts of:
   reading optical data from the image by the optical reader;
   translating the optical data into computer-readable data; and
   processing the computer-readable data.

4. The method of claim 3, wherein the processor associates one or more concepts with the image by processing the computer-readable data.

5. The method of claim 1, wherein the document comprises an image advertisement.

6. The method of claim 1, wherein the document comprises an image ad associated with an advertiser, and the image ad includes a link to a website associated with the advertiser.

7. The method of claim 6, further comprising:
   in response to a selection of the image ad by a user, causing the user to be directed to a website associated with the image ad.

8. The method of claim 1, wherein the document comprises a feedback mechanism to enable recipients to rate the document.

9. The method of claim 1, further comprising:
   comparing the image to at least one stored image by the image processor.

10. The method of claim 1, further comprising:
    identifying one or more concepts associated with the document by processing a file storing the image.

11. The method of claim 1, wherein the processor identifies human flesh content in the image.

12. The method of claim 1, wherein the document comprises an image ad, further comprising:
    receiving a request for a search result; and
    providing a search result comprising the image ad.

13. The method of claim 1, further comprising:
    disapproving the document responsive to a determination that the document contains inappropriate content.

14. The method of claim 1, wherein the document comprises an image ad, further comprising:
    approving the image ad based on a performance parameter of the image ad.

15. The method of claim 14, wherein the performance parameter is one of a click-through-rate, transaction volume, transaction rate, and number of feedback ratings.

16. The method of claim 1, further comprising:
distributing the document to the one or more rating entities.

17. The method of claim 1, wherein the document comprises an image ad associated with a concept, further comprising:
providing the image ad in response to a request for a document associated with the concept.

18. The method of claim 1, further comprising:
disapproving the document responsive to a determination that a provider refuses to distribute the document.

19. The method of claim 1, wherein the document comprises a link to a website, further comprising:
disapproving the document responsive to a determination that the link does not direct a user's browser to the website.

20. The method of claim 1, further comprising:
approving the document if the rating information does not contain an indication of inappropriate content.

21. The method of claim 1, wherein the rating information comprises at least one indication of inappropriate content, further comprising:
requesting rating information from one or more additional rating entities.

22. The method of claim 1, wherein the document comprises a link to a website, further comprising:
disapproving the document responsive to a determination that the website contains inappropriate content.

23. The method of claim 1, wherein the act of approving the document is further based on at least one trust score, wherein each trust score is associated with a specific one of the one or more rating entities.

24. The method of claim 23, further comprising:
modifying a trust score of a specific one of the one or more rating entities based on rating information received from the specific rating entity.

25. The method of claim 23, wherein at least one trust score is based on the geographical location of the associated specific one of the one or more rating entities.

26. The method of claim 23, wherein at least one trust score is based on one or more prior content ratings received from the associated specific one of the one or more rating entities.

27. The method of claim 23, wherein at least one trust score is based on an industry associated with the associated specific one of the one or more rating entities.

28. The method of claim 23, wherein at least one trust score is based on a rating deviation of a specific one of the one or more rating entities, wherein the rating deviation is based on a comparison of (i) rating information for one or more documents received from the specific rating entity and (ii) rating information for the one or more documents received from one or more other rating entities.

29. The method of claim 23, further comprising:
determining an aggregate rating based on the rating information and the at least one trust score, wherein the act of approving the document is further based on the aggregate rating.

30. The method of claim 29, wherein at least one trust score is based on a rating deviation of a rating entity, wherein the rating deviation is based on a comparison of (i) rating information for one or more documents received from the rating entity and (ii) aggregate ratings for the one or more documents.

31. The method of claim 23, wherein the trust score of a specific one of the one or more rating entities is based on rating information previously received from the specific rating entity for one or more documents.

32. The method of claim 23, further comprising:
determining one or more revised trust scores for one or more of the one or more rating entities; and
determining a revised aggregate rating based on the one or more revised trust scores.

33. The method of claim 23, wherein at least one of the at least one trust score is based on at least one of the geographical location of the associated rating entity and prior rating information received from the associated rating entity.

34. The method of claim 1, further comprising:
wherein the rating information comprises a refusal to distribute a document by a provider; and
blocking distribution of the document to the provider.

35. The method of claim 1, further comprising:
passing the document to one or more evaluators for manual review responsive to a determination that the processor did not approve the document.

36. The method of claim 1, wherein the rating information comprises information relating to at least one of sexual content, violent content, adult content, and targeted age content in the document.

37. The method of claim 1, wherein the document is associated with a document source, further comprising:
comparing the image to one or more stored images by a processor, wherein the one or more stored images is also associated with the document source.

38. The method of claim 37, wherein the one or more stored images comprises an approved image further comprising:
approving the image responsive to a determination that the image is substantially identical to the approved image.

39. The method of claim 1, further comprising:
receiving a signal relevant to a criteria; and
delivering the document in response to the signal based on the criteria and the rating information.

40. The method of claim 39, wherein the signal is a request received from an entity, the entity is associated with a suitability standard, and the delivering action is based on whether the document satisfies the suitability standard.

41. The method of claim 40, further comprising:
determining an aggregate rating based on the rating information; and
selecting the electronic document for distribution based on the aggregate rating and the suitability standard.

42. The method of claim 39, further comprising:
identifying at least one trust score, wherein each trust score is associated with a specific one of the one or more rating entities;
determining an aggregate rating based on the rating information and the at least one trust score, wherein the act of approving the document is further based on the aggregate rating.

43. The method of claim 39, wherein the criteria comprises a sensitivity score.

44. The method of claim 39, further comprising
receiving new rating information for the document; and
processing the new rating information to determine a revised aggregate rating associated with the document.

45. The method of claim 1, wherein the aggregate rating comprises a median of the rating information.

46. The method of claim 1, wherein the aggregate rating comprises a mode of the rating information.

47. The method of claim 1, wherein the aggregate rating comprises a quantity.

48. The method of claim 1, wherein the aggregate rating comprises a mean of the rating information.

49. The method of claim 1, further comprising:
associating the document with one or more concepts.

50. The method of claim 1, further comprising:
associating the document with one or more keywords based on the rating information.

51. The method of claim 50, further comprising:
receiving a request for a document associated with a concept, wherein the request is received from at least one of a provider and end user;
distributing the document to the at least one of a provider and end user, wherein the distributing action is based on an association between the concept and the one or more keywords.

52. The method of claim 1, wherein the document comprises a feedback mechanism to enable recipients to rate the document further comprising:
receiving a negative content rating of the document from at least one recipient; and
passing the document to at least one human evaluator based on the negative content rating.

53. The method of claim 1, wherein the document comprises a feedback mechanism to enable recipients to rate the document, further comprising:
receiving a negative content rating of the document from at least one recipient; and
approving or disapproving the document for distribution based on the negative content rating.

54. The method of claim 1, wherein the document is an image ad, further comprising:
determining the click-through-rate of the image ad; and
approving or disapproving the ad based on the click-through-rate.

55. An article of manufacture comprising a physical computer-readable medium encoded with computer program code for rating an electronic document comprising an image, the program code effective to instruct a machine to perform the following:
receive rating information associated with the document from two or more rating entities, wherein at least one of said two or more rating entities comprises a processor to determine content of the image and generate rating information associated with the image based on the determined content;
determine an aggregate rating for the document by aggregating the rating information; and
determine whether to approve the document for distribution to an end user computing device based on the aggregated rating information.

56. A system for rating documents, comprising:
an input device for receiving rating information associated with a document from one or more rating entities, wherein at least one of said one or more rating entities comprises an image processor;
a second image processor for determining image content and generating rating information associated with the image based on the determined content; and
a processor for determining an aggregate rating for the document by aggregating the rating information and whether to approve the document for distribution to an end user computing device based on the aggregated rating information.

57. A system for rating documents, comprising:
a rating receiving means for receiving rating information associated with a document from one or more rating entities, wherein at least one of said one or more rating entities comprises an image processor;
a second image processing means for determining image content and generating rating information associated with the image based on the determined content; and
determination means for determining an aggregate rating for the document by aggregating the rating information and whether to approve the document for distribution to an end user computing device based on the aggregated rating information.

58. A computer-implemented method comprising:
transmitting a signal to a server, the server interpreting the signal as being associated with a criteria for a document and determining whether a document comprising an image is to be delivered based in part on aggregated rating information received from a plurality of evaluators for one or more documents and based in part on whether the one or more documents relate to the criteria, wherein at least one of the one or more documents comprises an image, and wherein the plurality of evaluators comprises an image processor to process an image and rate a document; and
receiving a document comprising an image in response to the signal.

59. A computer-implemented method for rating a specific document comprising an image, the method implemented by a server system and comprising:
storing the document in memory;
distributing the document to two or more rating entities, wherein at least one of said two or more rating entities comprises a processor to determine rating information by processing at least one of a file storing the image and optical data of the image;
receiving rating information associated with the specific document from the two or more rating entities;
storing the rating information in the memory;
associating the specific document with one or more specific criteria;
determining an aggregate rating for the document by aggregating the rating information;
determining, using one or more processors, whether to approve the specific document for distribution to an end user computing device based on the aggregated rating information;
receiving a request for a document relevant to the criteria;
selecting a document for distribution from the memory, wherein the selecting action is based on the criteria and the rating information.

* * * * *